Aug. 25, 1970     G. NEUMANN     3,525,893

ELECTRIC MOTOR CONSTRUCTION

Filed Feb. 23, 1968

Inventor:
Gernot Neumann
By: Spencer & Kaye
Attorneys

United States Patent Office 3,525,893
Patented Aug. 25, 1970

3,525,893
ELECTRIC MOTOR CONSTRUCTION
Gernot Neumann, Lipperreihe, Germany, assignor to Hanning Elektro-Werke Robert Hanning, Bielefeld, Germany
Filed Feb. 23, 1968, Ser. No. 707,545
Claims priority, application Germany, Feb. 23, 1967, H 61,923
Int. Cl. H02k 7/10
U.S. Cl. 310—83     3 Claims

ABSTRACT OF THE DISCLOSURE

An electric motor including within its housing an axially arranged planetary gearing, of which an outer, stationary toothed ring, made of a plastics material, is located by means of radially or axially extending projections which engage in corresponding recesses in the motor housing.

---

For driving washing machines of all kinds, electric motors are known which comprising a planetary gearing arranged axially in the motor housing and having an external, stationary toothed ring. In some of these conventional construction styles the toothed rings have already been produced, according to the latest state of the art, from thermoplastic synthetic plastics material and possess a double-T-shaped cross-section, in the web of which there are bores for fastening the toothed ring to the motor housing.

The above-mentioned double-T-shaped cross-sectional formation of the toothed rings have the consequence that the total diameter of the electric motor in each case is determined largely by the external dimensions of its planetary gearing. Thus in many cases it is excessively large, which has in turn a quite disadvantageous effect upon the possibilities of use of the electric motors in washing machines, because the limited space conditions existing in washing machines require the smallest possible constructions.

In view of the difficulties which have arisen it is the aim of the present invention to produce an improved electric motor which shall be particularly suitable for the drive of washing machines and which has more favourable properties than the drive units of similar construction known at present.

The inventive measures to solve the stated problem consist primarily in that the outer, stationary toothed ring of the planetary gearing is made of a plastics material and has radially or axially extending dogs or pegs which engage in corresponding recesses of the motor housing. According to the results of numerous working tests, especially good results can be obtained here if the thickness of the back of the toothed ring is approximately equal to the tooth height, because under these conditions success is achieved not only in reducing the external diameter of the toothed ring in the desired manner to a minimum, but also in imparting to it as much internal strength as is necessary for its satisfactory functioning.

Further developments of the invention are concerned with the mounting of the toothed ring in the motor housing. The toothed ring may be held fast in the motor housing by means of a spring ring which engages in an annular groove arranged immediately behind the toothed ring, in the direction of insertion thereof, on the inside of the motor housing. The toothed ring can also be provided, on that annular surface facing the spring ring, with several raised portions of web form uniformly distributed around its periphery, which on insertion of the toothed ring into the motor housing come to lie at points where the spring ring is freely movable by a limited amount, as a result of interruptions or enlargements of the annular groove, so that the spring ring experiences minor outward bending by reason of which it presses the toothed ring resiliently against the motor housing. Finally with a view to an improved sealing of the gear space it is further proposed that the gear cover which closes off the gear space from the electric motor proper should be integral with the toothed ring.

The technical advance effected by the stated features of the invention is most noticeable in the reduction of the motor diameter, achieved by reason of the space-saving cross-section selected for the toothed ring. In addition, this new cross-sectional shape requires a different method of securing in relation to the motor housing, the radial web provided with screw holes formerly serving for this purpose now being omitted. The projections and recesses now utilised effectively hold the toothed ring and, furthermore, in combination with the use of a spring ring quite considerably simplify its installation.

A further merit of the invention can also be seen in the fact that a resilient toothed ring allows compensation for tolerances. The hard-running points which frequently occur as a result of binding in the case of toothed rings with double-T-shaped cross-section are therefore removed, and unnecessary losses of energy of the electric motor are avoided.

Finally the gear cover forming one common part with the toothed ring of the planetary gearing also brings about a complete seal for the gear space, so that the latter is protected against serious escape of grease.

An example of an embodiment of the invention will be described hereinafter by reference to the drawing, wherein.

Figure 1:
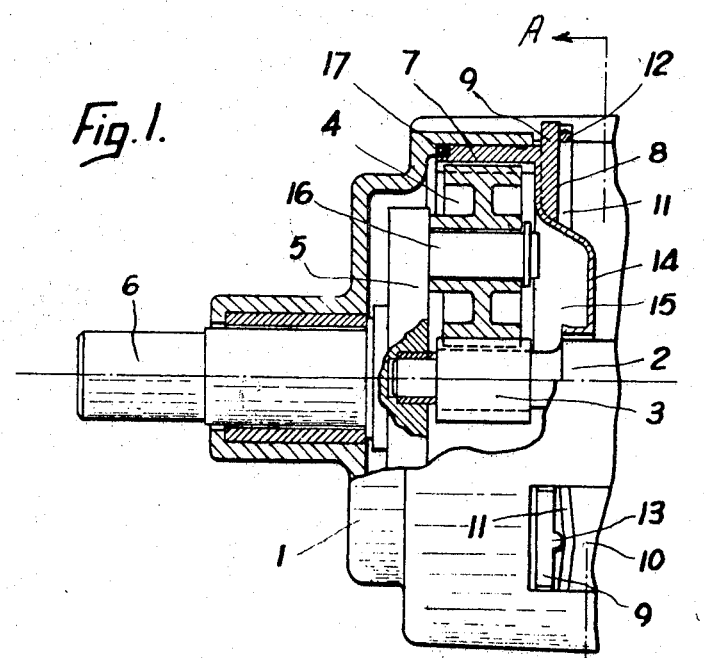
FIG. 1 shows the partially sectioned lateral elevation of an electric motor according to the invention in the region of its planetary gearing.
Figure 2:
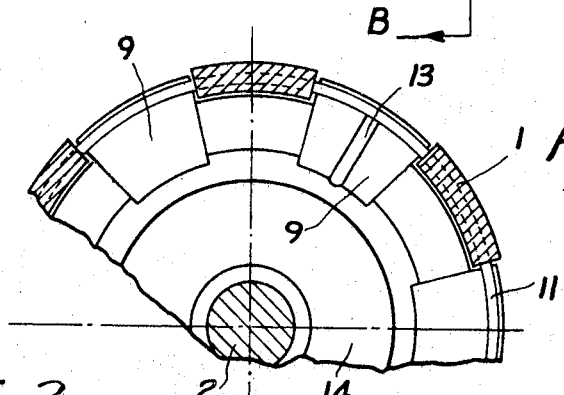
FIG. 2 shows the cross-section of the same electric motor on the line A–B in FIG. 1.
Figure 3:
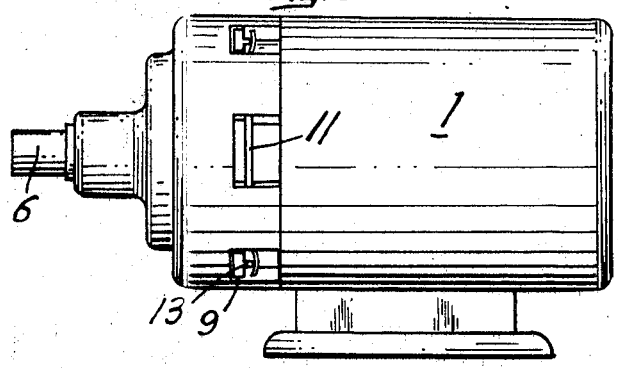
FIG. 3 shows a lateral elevation of a complete motor.

The electric motor accommodated in a motor housing 1 carries on a motor shaft 2 a sun wheel 3, around which two planet wheels 4 of a planetary gearing connected with the motor rotate. The two planet wheels 4 are in turn mounted by carrier bolts 16 on a disc 5 which is connected with a drive-output shaft 6. An internally toothed ring 7 surrounding the planet wheels 4, is produced from thermoplastic synthetic plastics material and possesses a very thin and elastically formed back, the thickness of which corresponds approximately to the tooth height, and forms the outer part of the planetary gearing. Radially disposed dogs 9 extend from the annular surface 8 of this toothed ring 7 and engage for the purpose of adjustment in recesses 10 in the motor housing 1.

The securing of the toothed ring 7 in the motor housing 1 is effected by a spring ring 11 arranged directly behind the toothed ring 7 in the direction of its insertion (from the right), which ring 11 is inserted into an annular groove 12 present on the inside of the motor housing 1. With its forward edge the toothed ring 7 presses against a rubber ring 17 by which the escape of grease from the space 15 containing the gearing is prevented. The pressure application to the toothed ring 7 necessary for this purpose is achieved by the spring ring 11 inasmuch as the annular surface 8 facing it is provided with several raised portions 13 of web form distributed uniformly over its periphery. On insertion of the toothed ring 7 into the motor housing 1, these come to lie at the points where the spring ring 11 is movable by a limited amount as a result of interruption of the annular groove 12 by recesses 10. In the present case the raised portions 13 of web form are therefore situated on the back of the dogs 9, so that the spring ring 11 experiences a slight outward bending (see lower part of FIG. 1) in their region and thus presses the toothed ring 7 resiliently against the rubber ring 17.

A gear cover 14 which closes off the space 15 from the electric motor proper is produced, according to a feature of the invention, integrally with the toothed ring 7. In this way a further good sealing of the space 15 is achieved, in order thus to prevent any loss of grease.

What I claim as new and desire to secure by Letters Patent of the United States is:

1. An electric motor comprising a housing, a planetary gearing arranged axially within said housing, a stationary outer toothed ring of plastic material forming part of said planetary gearing and having a back whose thickness is approximately equal to the tooth height, projections extending radially from said toothed ring into recesses in said motor housing, a spring ring engaging in an annular groove in the inside of said housing positioned directly behind said toothed ring in the direction of its insertion into said housing, ribs on said projections for displacing said spring ring at points where said spring ring is freely movable to a limited extent as a result of enlargements or interruptions of said annular groove for forcing said spring ring out of its normal configuration at these points and causing said spring ring to urge said toothed ring in a direction away from said spring ring so as to resiliently hold said toothed ring in said motor housing.

2. An electric motor as defined in claim 1, further comprising a gear cover for closing off the space housing said gearing from the electric motor proper, said gear cover being integral with said toothed ring.

3. An electric motor as defined in claim 1, further comprising an annular sealing ring compressed between said toothed ring and said housing under the action of said spring ring to form a seal for said gear cover.

References Cited

UNITED STATES PATENTS

| | | | |
|---|---|---|---|
| 2,417,195 | 3/1947 | Hargreaves | 310—258 |
| 3,319,093 | 5/1967 | Abdul | 310—50 |
| 3,321,650 | 5/1967 | Pedone et al. | 310—50 X |
| 3,427,484 | 2/1969 | Karlby et al. | 310—50 X |

MILTON O. HIRSHFIELD, Primary Examine

M. O. BUDD, Assistant Examine

U.S. Cl. X.R.

310—89